(12) United States Patent
Bernardi et al.

(10) Patent No.: US 7,880,743 B2
(45) Date of Patent: Feb. 1, 2011

(54) SYSTEMS AND METHODS FOR ELLIPTICAL FILTERING

(75) Inventors: Chris Bernardi, Alameda, CA (US); Manuel Kraemer, Oakland, CA (US)

(73) Assignee: Pixar, Emeryville, CA (US)

( * ) Notice: Subject to any disclaimer, the term of this patent is extended or adjusted under 35 U.S.C. 154(b) by 452 days.

(21) Appl. No.: 11/682,853

(22) Filed: Mar. 6, 2007

(65) Prior Publication Data

US 2007/0285431 A1 Dec. 13, 2007

Related U.S. Application Data

(60) Provisional application No. 60/812,309, filed on Jun. 8, 2006.

(51) Int. Cl.
*G09G 5/00* (2006.01)
*G06T 15/50* (2006.01)

(52) U.S. Cl. ............... 345/581; 345/426; 345/582; 345/606; 345/608

(58) Field of Classification Search .......... 345/581, 345/606, 608, 426, 582
See application file for complete search history.

(56) References Cited

U.S. PATENT DOCUMENTS

| 6,664,971 B1 * | 12/2003 | Mukherjee et al. ......... 345/582 |
| 7,525,551 B1 * | 4/2009 | Newhall et al. ............ 345/587 |
| 2004/0239672 A1 * | 12/2004 | Schmidt ..................... 345/426 |

OTHER PUBLICATIONS

Hyn-Chul Shin, Jin-Aeon Lee, and Lee-Sup Kim. "SPAF: Sub-texel Precision Anisotropic Filtering," 2001, Proceedings of the ACM SIGGRAPH/EUROGRAPHICS Workshop on Graphics Hardware, pp. 99-108.*

Baoquan Chen, Frank Dachille, and Arie. E. Kaufman. "Footprint area sampled texturing," 2004, IEEE Transactions on Visualization and Computer Graphics, vol. 10, Issue 2, pp. 230-240.*

Joel McCormack, et al., "Feline: Fast Elliptical Lines for Anisotropic Texture Mapping," Compaq Computer Corporation's Western Research Laboratory and Mitsubishi Electric Research Laboratory; SIGGRAPH 99, Los Angeles, CA USA, Copyright ACM 1999 0-201-48560-5/99/08.

A. Apodaca, Shader Antialiasing, Advanced RenderMan: Creating CGI for Motion Pictures,1999, pp. 263-280 The Morgan Kaufmann Series in Computer Graphics, San Francisco, California, U.S.A.

* cited by examiner

*Primary Examiner*—Chante Harrison
(74) *Attorney, Agent, or Firm*—Townsend and Townsend and Crew LLP

(57) ABSTRACT

An improved attribute determination process allows the sharpness of a surface attribute function to be adjusted on a per-object, per-surface, per-texture, per-function, or other appropriate basis. A computer-based animator then can selectively adjust the sharpness or other attribute(s) of portions of a to-be-rendered image without significantly increasing the rendering time. For a selected texture, corresponding sampling regions will be shifted about the respective surface points projected in texture space. A multi-dimensional set of sub-regions can be generated for the shifted sampling region. Bounding boxes can be determined for each sub-region, the boxes occupying less area, such as in texture space, than a single bounding box for the original sampling region. The bounding boxes can be used for local attribute determinations (such as texture lookups) for each sub-region, with the local attributes being processed to determine an attribute for the respective surface point.

23 Claims, 8 Drawing Sheets

1

SYSTEMS AND METHODS FOR ELLIPTICAL FILTERING

CLAIM OF PRIORITY

This application claims priority to U.S. Provisional Application No. 60/812,309, entitled "Systems and Methods for Elliptical Filtering," filed Jun. 8, 2006, which is hereby incorporated herein by reference.

BACKGROUND OF THE INVENTION

The present invention relates to the field of computer graphics, and in particular to methods and apparatus for optimizing the determination of attributes associated with surface points.

Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene. Animated sequences can be created by rendering a sequence of images of a scene as the scene is gradually changed over time. A great deal of effort has been devoted to making realistic looking rendered images and animations.

Surface attribute functions can define the values of attributes of surfaces in three-dimensional space. Surface attribute functions can be evaluated at any point on the surface to provide corresponding attribute values at that point on the surface. Attributes of surfaces can include optical properties of a surface, such as color, transparency, reflectivity, and refractivity. Attributes can also include visibility or occlusion information; artistically or procedurally generated texture data in one, two, three, or more dimensions; noise functions in one, two, three, or more dimensions, which can be used to procedurally generate or modify other surface attributes; shadow generation information; forces or attributes used for physics, cloth, fluid, or other types of simulations; animation data, which can be used to specify motion of entities associated with a surface point, such as fur or hair; modeling parameters, such as the density of procedurally generated grass applied to a model of a landscape; illumination information, which specifies the amount and direction of light on the surface point from other portions of the scene; and rendering information, such as ray tracing path information or radiosity rendering information. Functions can be relatively simple, such as looking up texture data from a texture map, or very complex, such as the evaluation of complex user-defined shader programs, ray tracing programs, animation or modeling programs, or simulation programs.

An application such as a rendering or animation application determines pixel values in an image by evaluating or sampling a surface and its associated surface attribute functions. Surfaces can include triangles and polygons; higher-order surfaces such as B-splines; subdivision surfaces; and implicit surfaces, among others.

In one rendering technique, surfaces are divided or "tessellated" into a mesh of sub-pixel size quadrilaterals, typically referred to as "micropolygons." A shader evaluates surface attribute functions to assign a color or other attribute values to a vertex of each micropolygon. Shading can be computed for each corner vertex, and then be interpolated, or can be computed only once for the whole micropolygon. The shading rate specifies the size and number of micropolygons, and hence the number of samples of the surface attribute function evaluated for surfaces. In many instances a pixel might contain at least portions of several micropolygons. By averaging, weighting, filtering, or otherwise combining these micropolygons, the renderer can determine values for each pixel and create a highly detailed image. In some applications, each pixel is associated with a filter kernel specifying the weights used to combine samples as a function of distance from the center of the pixel.

Selecting the optimal sampling or shading rate is critical for creating high quality images. If the sampling rate is too low, the surface attribute functions of a surface will be undersampled, resulting in a blurred image and other loss of detail. However, if the sampling rate is increased, the number of surface attribute function samples required to render the image increases, which dramatically increases the time, memory, and computing resources needed to render an image.

Ideally, the size of the samples of a surface attribute function should be equal to the size of a pixel's filter kernel projected onto the surface. For example, a circular pixel filter kernel projected onto a surface aligned with the image plane defines a circular region on the surface. This example circular region is the ideal sample size for surface attribute functions at this point on the surface.

However, most surfaces are angled, rather than aligned, with the image plane. As a result, if the kernel of a pixel in the image plane is projected onto the angled surface, the shape of the corresponding region of the surface to be sampled will be distorted from that of original filter kernel. For example, if a circular pixel filter kernel projected onto a surface angled relative to the image plane, the corresponding sample region will be shaped like an ellipse. Similarly, a square pixel filter kernel projected onto a surface angled relative to the image plane results in a trapezoid shaped for the corresponding sample region. Generally, this requires surfaces at an angle to the image plane to be sampled anisotropically, or at different sample rates in different directions, to accurately evaluate surface attribute functions.

Many renderers ignore the need for anisotropic sampling and use isotropic samples, or samples that are the same size in all directions, for all surfaces, regardless of the actual shape of the sample region. When the area of the sample exceeds the area of the desired sample region, such as when a circular sample is used to approximate an elliptical sample region, the sample may include significant amounts of data outside the desired sample region. This excess data included in the sample causes unwelcome blurring artifacts of the surface attribute functions. These blurring artifacts are especially noticeable if the surface attribute function includes sharp details, such as a texture map with text or sharp lines, or if the angle between the image plane and the surface is large.

To compensate for these artifacts, the sampling rate can be increased to produce smaller samples. The increased number of smaller samples better approximates the elliptical shape of the desired sample area. However, increasing the sampling rate for an entire image results in an enormous increase in the amount of data to be processed. In some cases, decreasing the sample size to a point where desired accuracy or sharpness is obtained for the entire image is not practical, as the memory requirements or necessary rendering time are too great. This is especially undesirable when only a small portion of the image, such as fine lines or writing, is unacceptably blurred or otherwise needs improved sampling.

To more accurately sample surfaces angled to the image plane, it would be desirable to use samples or filter kernels, for example, that have different sized edges, or that otherwise have different dimensions in various directions. For example, an elliptical filtering approach uses an elliptical-shaped distribution of samples to evaluate various surface attribute functions. The elliptical samples match the elliptically-shaped sample regions produced by the projection of an elliptical filter kernel on to a surface at an angle to the image plane. Elliptical filtering, however, is analytically and computationally difficult to implement. Doing accurate elliptical filtering would require determining the size and direction or orientation of each elliptical filtering region used for the various surfaces of an image.

It therefore is desirable to develop a process for increasing the detail of an image, or a portion of an image, by approximating sampling areas such as elliptical sampling areas that more accurately represent those surface portions that, when projected onto the image plane, correspond to pixels of the final image.

BRIEF SUMMARY OF THE INVENTION

Systems and methods in accordance with various embodiments of the present invention provide for performing attribute determinations for surface points, useful for increasing the visual detail of an image, such as on a per-object, per-surface, or per-texture basis. The attribute can be any appropriate attribute known in the art, such as a color to be associated with that surface point. The surface point typically will lie on a surface that is angled and at a "distance" with respect to the image plane, and will have an associated location and sampling region. In one embodiment, derivative vectors for a surface point are used to approximate a micropolygon or other sampling region corresponding to that surface point.

In one embodiment, a sampling region is determined for a surface point, and can be shifted or otherwise determined to be approximately centered about the surface point. A multi-dimensional set of sub-regions is approximated in the sampling region. The number and sizes of the sub-regions can be determined by the size and/or shape of the sampling region. A local attribute lookup or determination function can be executed for each sub-region. The determination can be based on a pre-computed array of values for that sub-region. In one embodiment, a bounding box is created for each sub-region to assist in the lookup. The set of bounding boxes for the sub-regions occupy less area than a single bounding box that would otherwise be used for the original sampling region. The results of the local attribute determinations are processed, such as by averaging, weighted averaging, or otherwise combining, to determine an attribute for the original surface point.

In another embodiment, the surface point has a location in texture space and a sampling region associated therewith. A multi-dimensional set of sub-regions is generated about the surface point in texture space. For each sub-region, a bounding box is generated to be used for a texture lookup. The set of bounding boxes for the sub-regions can occupy less area in texture space than a single bounding box that would otherwise be used for the original region. A texture lookup can be done for each sub-region using the respective bounding box. The results of these texture lookups can be processed, such as by averaging, weighted averaging, or other combining, to determine an attribute for the original surface point.

Other embodiments will be obvious to one of ordinary skill in the art in light of the description and figures contained herein.

BRIEF DESCRIPTION OF THE DRAWINGS

Various embodiments in accordance with the present invention will be described with reference to the drawings, in which.

DETAILED DESCRIPTION OF THE INVENTION

Systems and methods in accordance with various embodiments of the present invention can overcome the aforementioned and other deficiencies in existing animation and rendering systems by changing the way in which attributes are determined for surface points, objects, and various other elements. In one embodiment, the way in which the color or other visual attribute of a surface point or micropolygon is determined is improved by allowing an animator to increase the number of samples of the surface attribute functions that are evaluated (e.g., texture lookups) without affecting the number of samples for other objects, surfaces, or textures in that frame. Such an approach can be independently applied to any texture, surface, object, or other basis, and can provide a much faster approach than the brute force approach of oversampling the entire shader or even an entire scene.

As discussed above, a surface to be rendered in one embodiment can be broken down into micropolygons. For each micropolygon, a surface attribute function can be evaluated to determine the appropriate color to assign to that micropolygon, typically assigned as a surface point corresponding to a vertex for the micropolygon. Oftentimes, this evaluation will include at least one texture map. The use of texture maps, or "texture mapping," is a common technique used for simulating detail on the surface of an object model by mapping images or "textures" onto the various micropolygons of that object. An object or surface can have multiple overlapping textures mapped thereon, with each micropolygon having associated therewith at least one texture. A texture map can be thought of as an image that resides in its own texture coordinate space, typically designated as (u, v) space as known in the art.

Figure 1A:
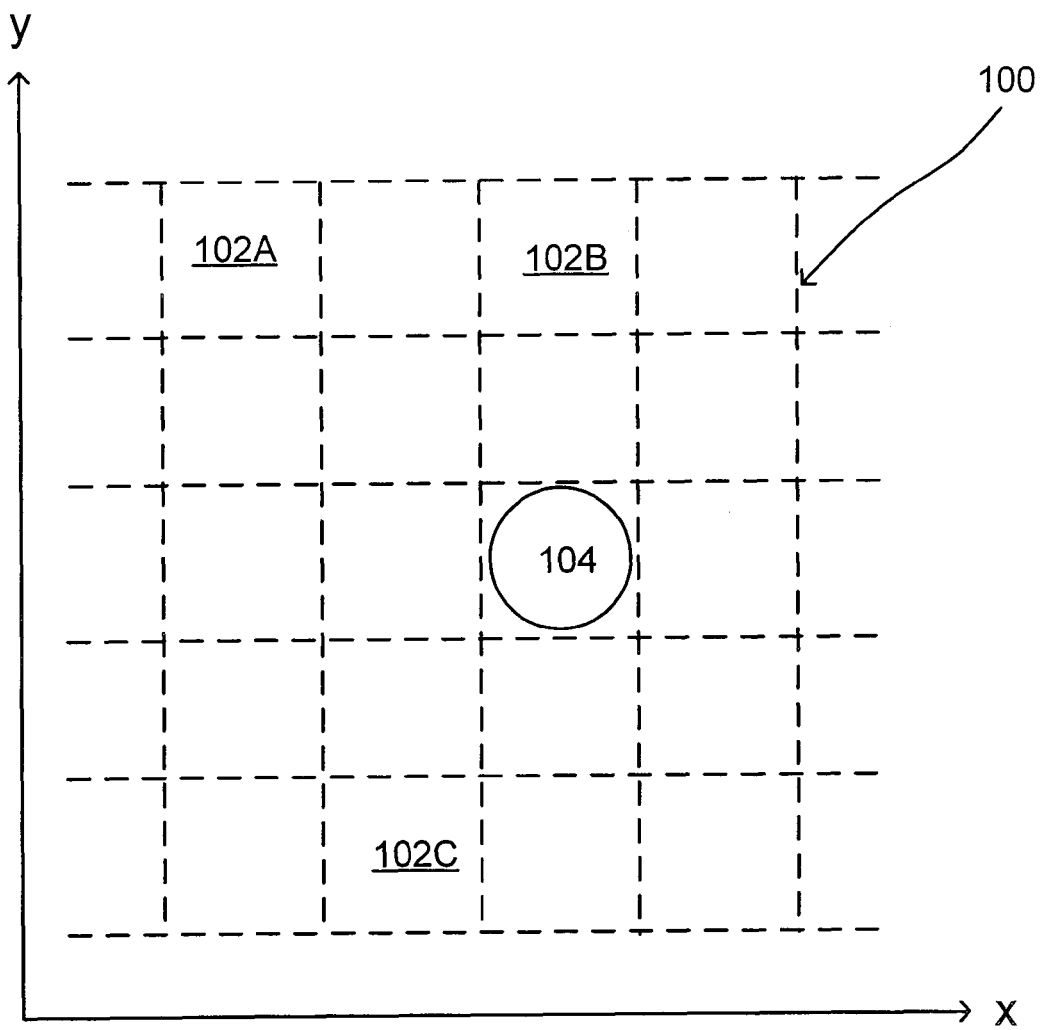
FIG. 1(a) illustrates an example image plane.
Figure 1B:
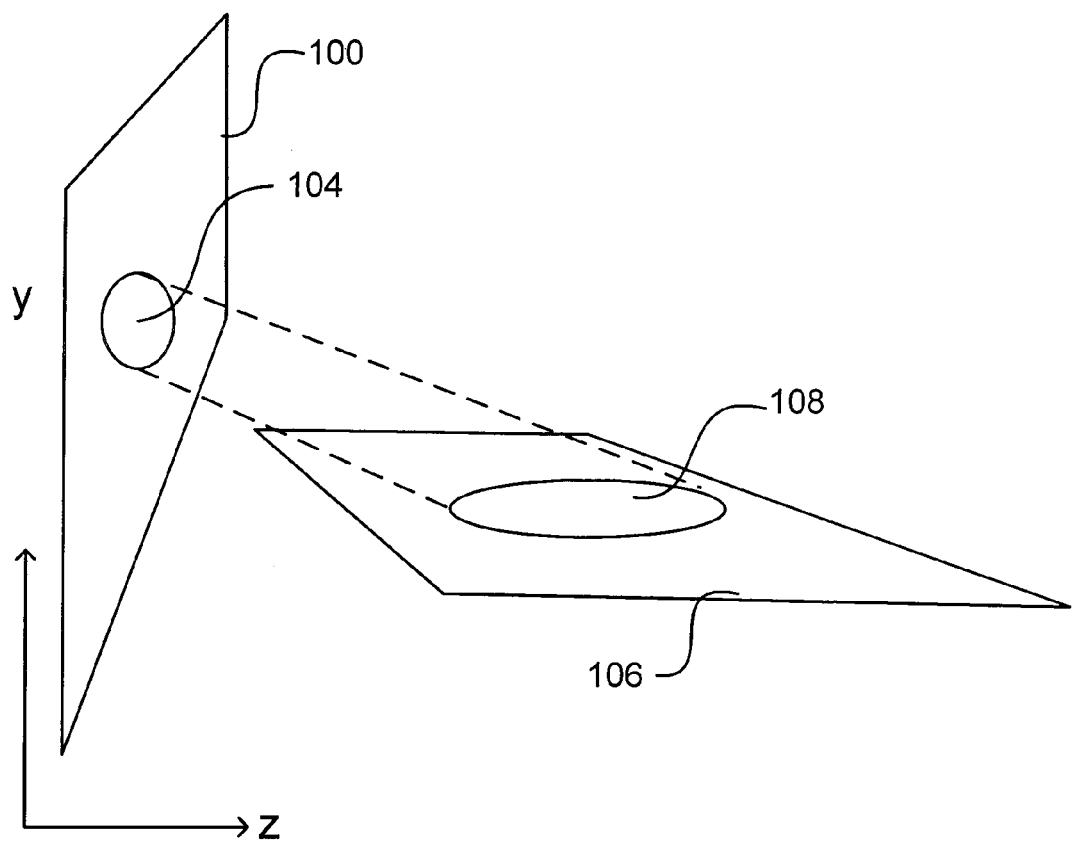
FIG. 1(b) illustrates a side view of an image plane and a circular filter kernel.
Figure 1C:
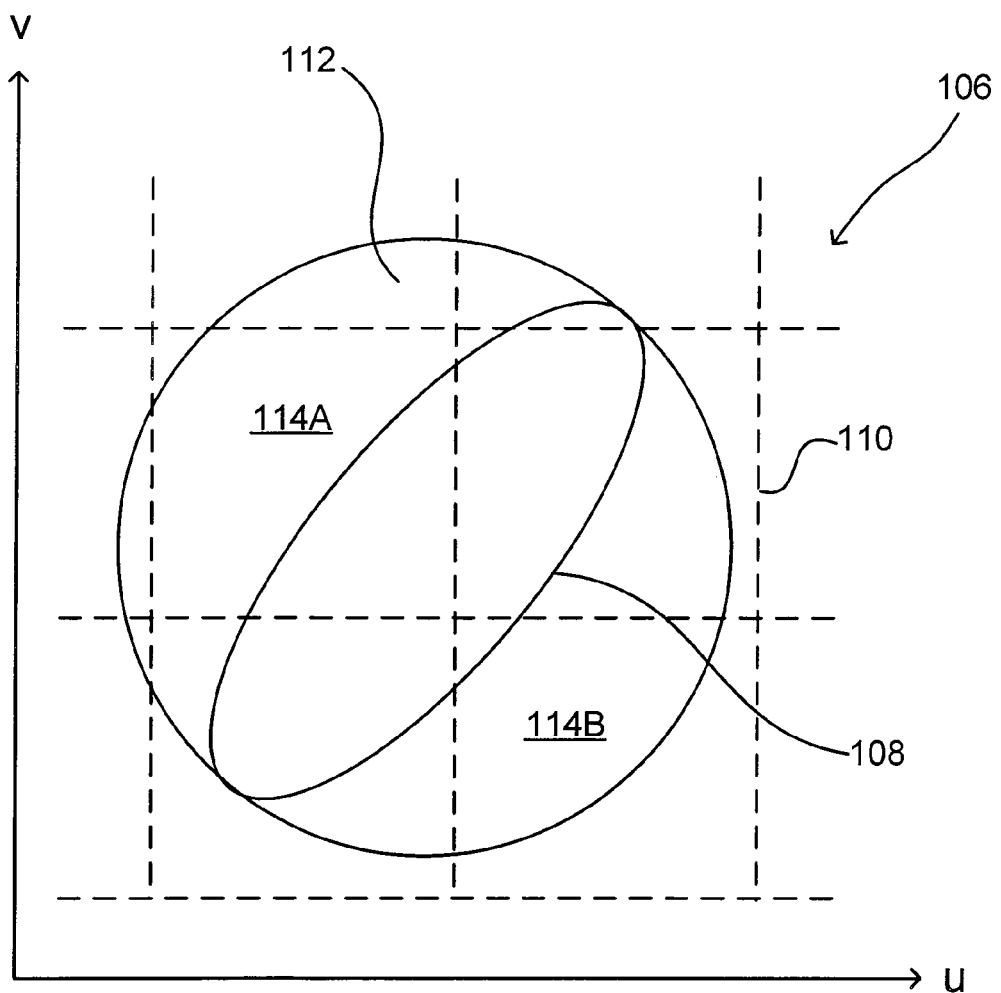
FIG. 1(c) illustrates an overhead view of a surface.

FIGS. 1(a)-(c) illustrate the sampling of a surface and its surface attribute function by a renderer. FIG. 1(a) illustrates an example image plane 100. Image plane 100 includes a set of pixels such as pixels 102A, 102B, and 102C. Each pixel represents the value of a sample of a three dimensional scene. The value of a pixel can be determined by projecting one or more samples of the scene, such as micropolygons from one or more surfaces, on to the image plane 100 and then combining the values of the projected samples for each corresponding pixel. Each pixel can include a filter kernel, such as filter kernel 104, that specifies the weights used to combine samples as a function of distance from the center of the pixel.

As discussed above, the filter kernel of a pixel can be projected back on to a surface in the scene to determine the ideal sample region. FIG. 1(b) illustrates a side view of the image plane 100 and circular filter kernel 104. In FIG. 1(b), the filter kernel 104 has been projected back on to the surface 106. In this example, surface 106 is at an angle to the image plane 100. Sample region 108 is defined by the projection of filter kernel 104.

In this example, sample region 108 is in the shape of an ellipse, even though the filter kernel 104 is circular. This is illustrated more clearly in FIG. 1(c). In FIG. 1(c) shows an overhead view of the surface 106. As can be seen in this view, the sample region 108 is an ellipse.

A surface attribute function 100, such as a texture map, provides surface attribute values for surface 106. To determine the value of the pixel associated with the filter kernel 104, the surface attribute function 110 should be sampled only within the sample region 108. However, due the difficulties with elliptical filtering, some renderers approximate sample region 108 with an isotropic sample region 112. Isotropic sample region 112 includes additional portions 114A and 114B of the surface attribute function 110, which are outside of the ellipse of sample region 108 but inside the circle of isotropic sample region 112. Because these additional portions 114A and 114B are not within the sample region 108, their contribution to the value of a pixel causes blurring artifacts.

A system in accordance one embodiment provides a better approximation of anisotropic sample regions, such as ellipses, by increasing the number of samples and decreasing the size of sample regions for the objects, surfaces, textures, and/or any other portion of the scene that requires an increase in sharpness or visual accuracy.

Figure 2:
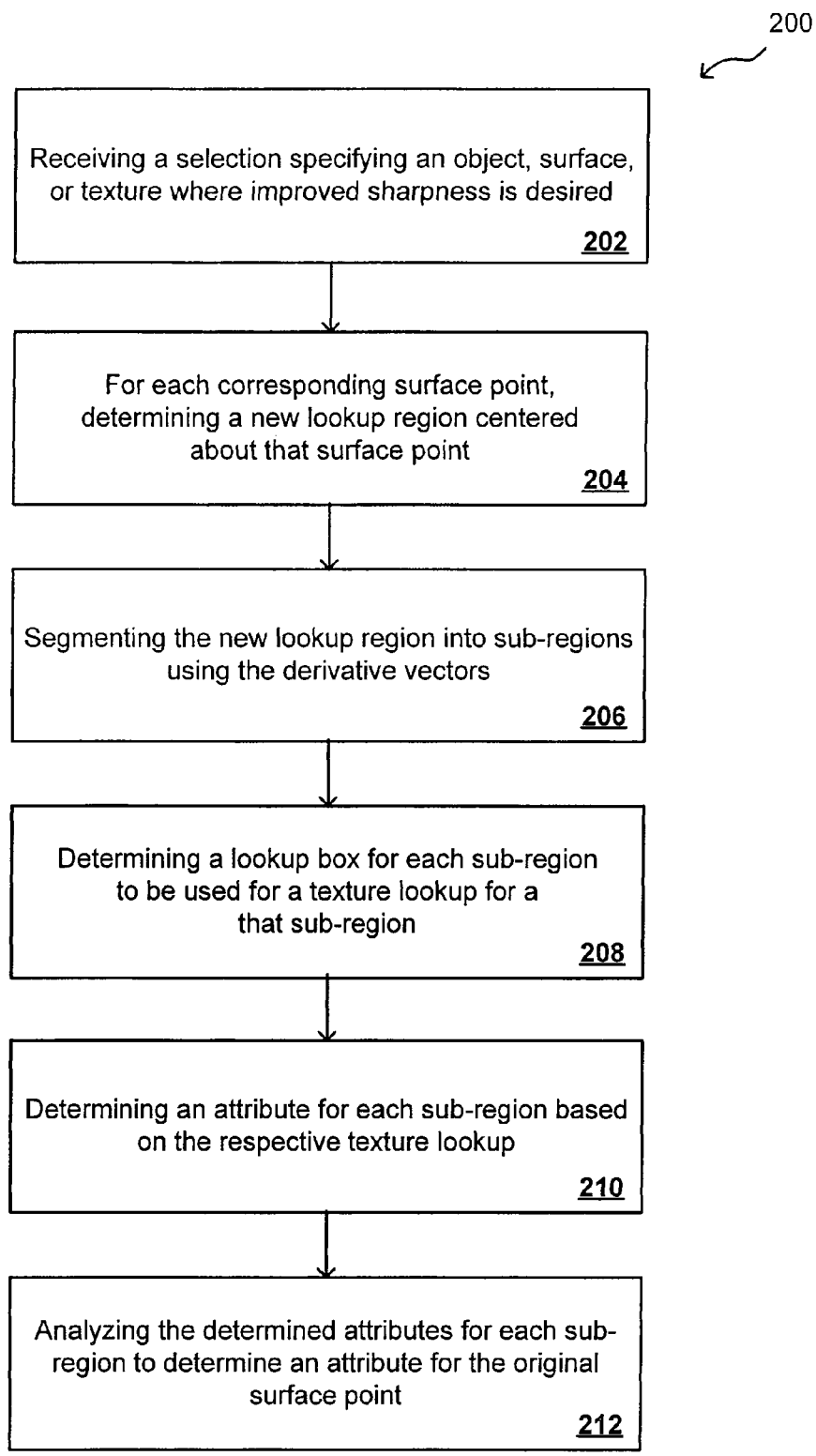
FIG. 2 illustrates steps of a process that can be used in accordance with one embodiment of the present invention.

FIG. 2 illustrates steps of an exemplary process 200 that can be used in accordance with one embodiment of the present invention. In step 202 a selection is received from a user specifying an object, surface, texture, or other surface attribute function where improved sharpness or attribute accuracy is desired. In an embodiment, an animator or renderer sets a sharpness attribute of the object, surface, texture, or other surface attribute function with a shading or rendering tool to indicate that the process 200 is to be applied to this entity.

For each surface point corresponding to that object, surface, or texture, a sampling region is determined. This sampling region typically is defined in texture space, although other sampling approaches can be used as known to one of ordinary skill in the art. Since derivative vectors dP/du and dP/dv are known for each point P(u,v) in texture space, the sampling region can correspond to a micropolygon defined by those vectors, wherein the surface point corresponds to a vertex of the sampling region.

Figure 3:
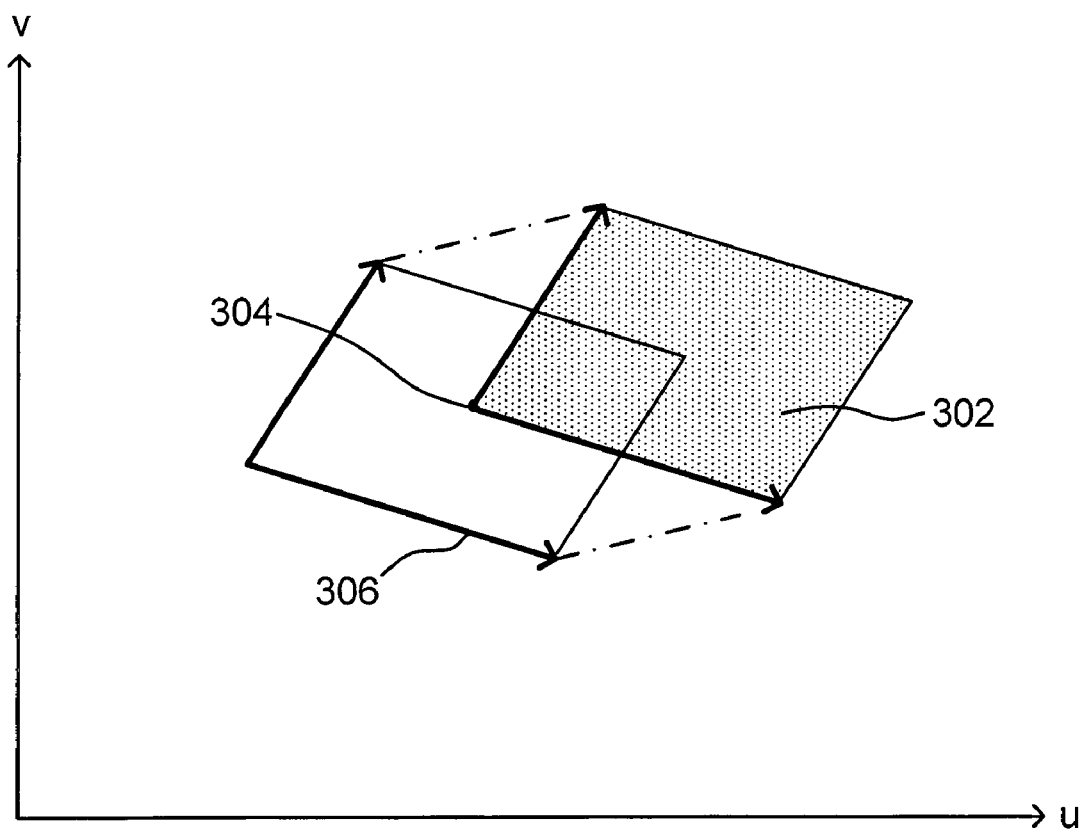
FIG. 3 illustrates a shifted micropolygon sampling region for a surface point in accordance with one embodiment of the present invention.

Since only one surface point is being sampled per lookup, the sampling region is shifted in step 204 so that the surface point P is in the center of a new sampling region, such as a new micropolygon having new (shifted) derivative vectors. As shown in FIG. 3, the projection of the original micropolygon 302 has the surface point 304 at the vertex of the derivatives defining that micropolygon. By "shifting" the position of the micropolygon sampling region used for the lookup (such as by moving back one half the sum of the two vectors), a new lookup micropolygon sampling region 306 can be generated that has the surface point 304 at its center. Shifting the sampling region to be centered about the surface point can improve the accuracy of the sampling for that surface point, as the sampling will be more representative of the surroundings of the surface point.

Figure 4:
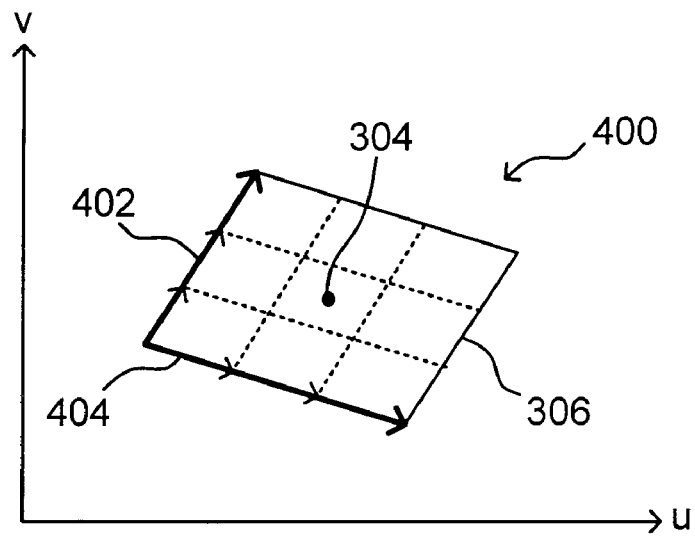
FIG. 4 illustrates sub-regions based on sub-division of the vectors in accordance with one embodiment of the present invention.

A multi-dimensional (e.g., two-dimensional or three-dimensional) set of sub-sampling regions, or "sub-regions," then can be formed in the original (or shifted) sampling region in step 206. In an example using "shifted" derivative vectors associated with the new sampling region, the new sampling region is segmented into a multi-dimensional set of sub-regions, such as by segmenting the shifted vectors then using the segments to form smaller sub-regions only for the sampling region of interest. The plot 400 of FIG. 4 shows the shifted sampling region 306 centered about the surface point 304, with reference numbers carried over for simplicity of understanding only. The shifted vectors 402, 404 can be segmented, then used to form smaller sub-regions only for the sampling region 306 of interest. For example, the shifted vectors 402, 404 in FIG. 4 are segmented into thirds, forming a 3×3 array of sub-regions inside the micropolygon sampling region 306 and centered around the surface point 304. This is similar to dropping the shading rate, but only for the texture of interest. It also should be noted that micropolygons typically are only approximated in texture space using the pair of vectors, so that each sub-region may only be approximated based on the segmented vectors. Further, other shapes, sizes, and sets of sub-regions can be used as would be apparent to one of ordinary skill in the art in light of the description and suggestions contained herein. In some embodiments, different sub-regions can have different shapes and/or different sizes, such as to better approximate the desired sampling region.

Figure 5:
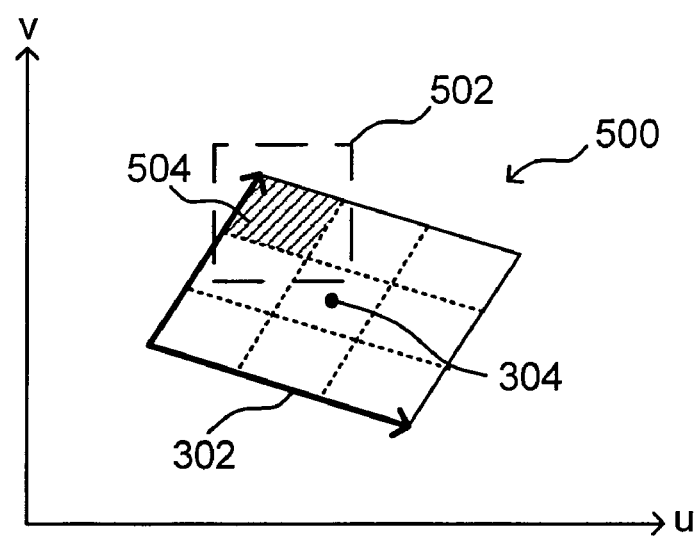
FIG. 5 illustrates a bounding box for one of sub-regions in accordance with one embodiment of the present invention.

A lookup box, or bounding box, can be determined for each sub-region in step 208, such as by generating a lookup box for a texture lookup corresponding to a vertex point of each respective sub-region. In other embodiments, other approximations or regions can be used for a texture lookup or other type of evaluation of a surface attribute function as would be understood to one of ordinary skill in the art. As illustrated in the plot 500 of FIG. 5, this can involve using a new, smaller bounding box 502 for each sub-region 504 examined. The size of this bounding box 504 can be defined by the MIP level (or can correspond directly to the size of the sub-region), but a different MIP level can be used than for an original bounding box that would have been used for the initial micropolygon.

Figure 6:
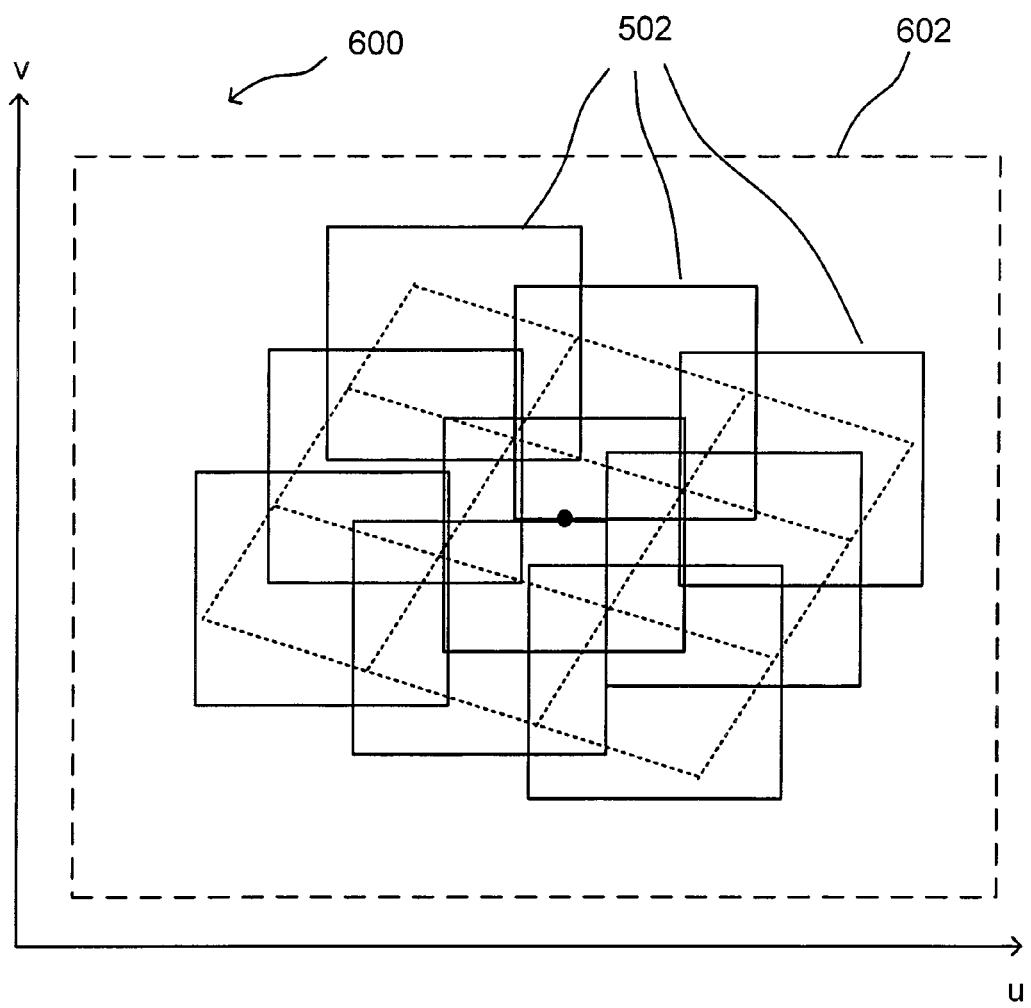
FIG. 6 illustrates a plurality of bounding boxes for sub-regions of an original micropolygon sampling region in accordance with one embodiment of the present invention.

A local attribute then is determined for each sub-region, such as may be based on a texture lookup for that sub-region, in step 210. The determination can be based on a pre-computed array of values for that sub-region as discussed above. The look-ups can correspond to vertices of the sub-regions, where appropriate, or can correspond to any other appropriate point or points of the sub-regions. The plot 600 of FIG. 6 shows an area covered by bounding boxes for each sub-region, which ultimately can be combined to determine the attribute(s) of the surface point. As can be seen in this example, the area in texture space used to define the surface point more closely matches the shape of the micropolygon projection, being somewhat elliptical in shape. Further, imposing a bounding box 602 the size of the original bounding box on the plot (for explanation) purposes shows the drastic reduction in data outside the micropolygon sampling region that is averaged, blurred, or otherwise processed to determine, for example, the appropriate color to assign to the surface point. Further still, the area to be processed is approximately centered about the surface point and analyzed at a higher data level, thereby providing a much more accurate value that is likely to significantly improve the clarify and sharpness of the texture after rendering. The small number of additional lookups for the selected texture(s) in many cases will be almost negligible.

The local attributes for each sub-region then are analyzed in step 212 to determine an attribute for the surface point corresponding to the original micropolygon sampling region. As discussed above, this can include averaging, weighted averaging, or any other appropriate approach for combining or otherwise processing the attributes. In one approach, these values are weighted based on a position in the overall micropolygon sampling region or an amount of area inside the sampling region. For example, a sub-region at the center of the sampling region might be weighted more in the average than a sub-region along the outside. Further, if the look-ups still occur for vertices on the edges of the sub-regions, a vertex that is on the edge of the sampling region might be weighted less than a vertex in the interior of the sampling region, even though both sub-regions might be on the edge of the sampling region.

The additional lookups can happen inside a surface shader at the shader level. In some shaders there is an oversampling control that can be used for all texture calls, where if the sampling control is set to 1 the shader goes through all the texture calls once. If the control is set to 2, the shader goes through in a 2×2 fashion. The additional lookups could be set up in a similar fashion.

Such an approach also is not limited to a texture subsystem, but can be done for any procedural texturer, shader, or other similar device. At any point in the process where there are approximations for blurriness, or where image accuracy can be improved, such an approach can be used.

Figure 7:
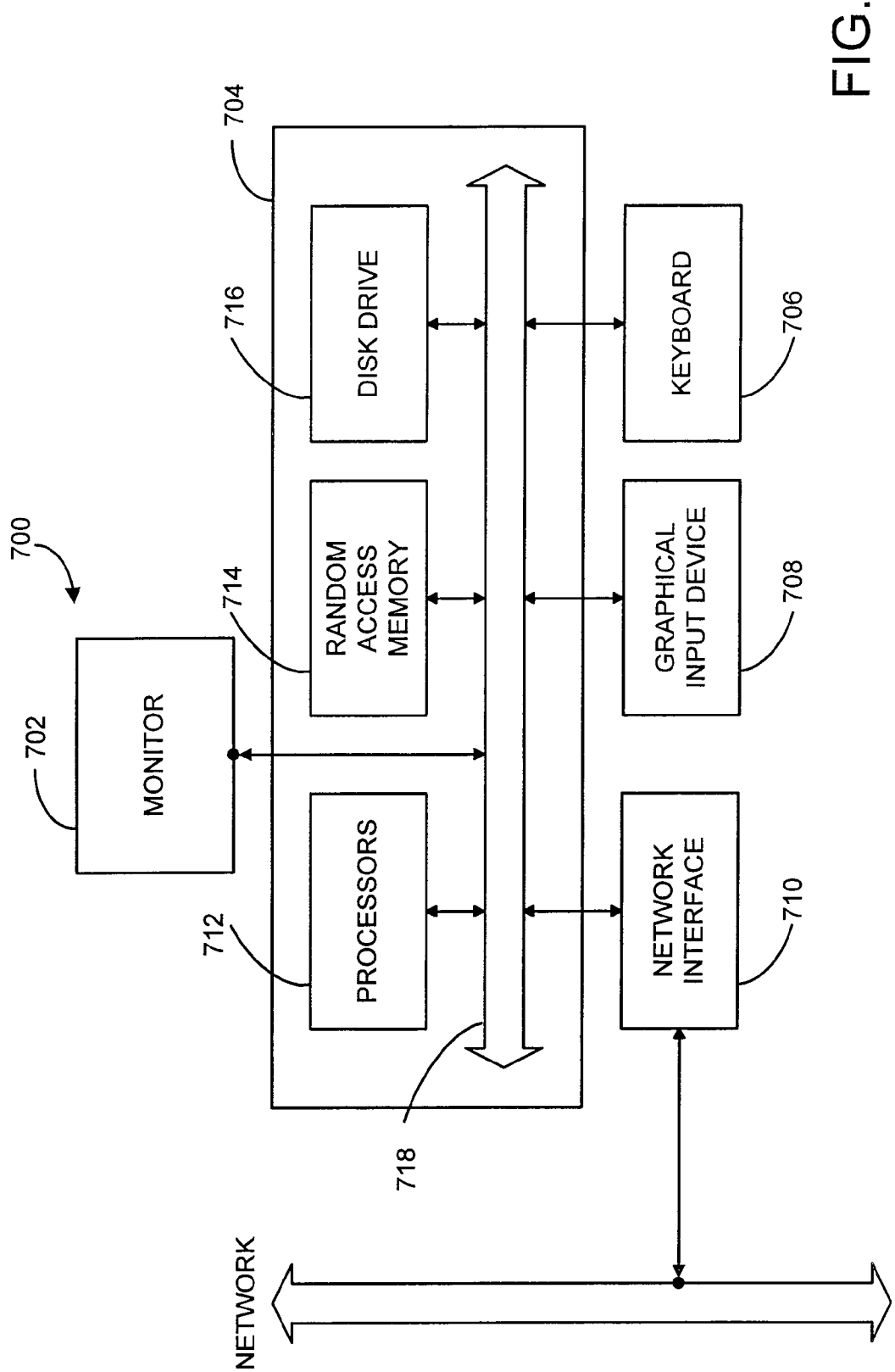
FIG. 7 illustrates a processing system that can be used with various embodiments of the present invention.

FIG. 7 illustrates an example computer system 700 suitable for implementing an embodiment of the invention. Computer system 700 typically includes a monitor 702, computer 704, a keyboard 706, a user input device 708, and a network interface 710. User input device 708 includes a computer mouse, a trackball, a track pad, graphics tablet, touch screen, and/or other wired or wireless input devices that allow a user to create or select graphics, objects, icons, and/or text appearing on the monitor 702. Embodiments of network interface 710 typically provides wired or wireless communication with an electronic communications network, such as a local area network, a wide area network, for example the Internet, and/or virtual networks, for example a virtual private network (VPN).

Computer 704 typically includes components such as one or more processors 712, and memory storage devices, such as a random access memory (RAM) 714, disk drives 716, and a system bus 718 interconnecting the above components. Processors 712 can include one or more general purpose processors and optional special purpose processors for processing video data, audio data, or other types of data. RAM 714 and disk drive 716 are examples of tangible computer-readable media for storage of data, audio/video files, computer programs, applet interpreters or compilers, virtual machines, and embodiments of the herein described invention. Other types of tangible computer-readable media include floppy disks; removable hard disks; optical storage media such as DVD-ROM, CD-ROM, MINIDISC, optical discs, and bar codes; non-volatile memory devices such as flash memories; read-only-memories (ROMS); battery-backed volatile memories; networked storage devices. Computer-readable media also can include a data signal embodied in a carrier wave.

Further embodiments can be envisioned to one of ordinary skill in the art in light of the teachings an suggestions contained herein. Other embodiments, including combinations or sub-combinations of the above disclosed embodiments can be advantageously made as would be understood to one of ordinary skill in the art. The block diagrams of the architecture and flow charts are examples used for ease of understanding. However it should be understood that combinations, additions, re-arrangement, and the like are contemplated in alternative embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of performing an attribute determination for a surface point, comprising the following steps, implemented in a computer system, of:
   receiving a surface point having an attribute to be determined, the surface point having a location and a micropolygon sampling region associated therewith;
   determining a multi-dimensional set of sub-regions in the sampling region, the set of sub-regions having two or more dimensions in texture space, the sizes of the sub-regions being determined by at least one of a size and a shape of the sampling region;
   creating a set of bounding boxes corresponding to the multi-dimensional set of sub-regions, the set of bounding boxes occupying less area than a single bounding box corresponding to the sampling region in texture space;
   determining, using the bounding boxes, a local attribute for each sub-region based on a pre-computed array of values for that sub-region; and
   processing the local attributes for each sub-region to determine an attribute for the surface point.

2. A method according to claim 1, wherein:
   the surface point further has a set of derivative vectors, whereby the location and the derivative vectors define the sample region.

3. A method according to claim 2, wherein:
   the step of determining a multi-dimensional set of sub-regions includes subdividing the derivative vectors and determining the sub-regions based on the subdivided derivative vectors.

4. A method according to claim 3, wherein:
   the location and derivative vectors are defined in texture space.

5. A method according to claim 1, wherein:
   all of the sub-regions for the surface point are symmetric.

6. A method according to claim 1, wherein:
   all of the sub-regions for the surface point are substantially the same size.

7. A method according to claim 1, wherein:
   the step of determining a local attribute for each sub-region is based on a respective bounding box from the set of bounding boxes.

8. A method according to claim 1, further comprising:
   shifting the sampling region about the surface point before determining the local attribute for each sub-region.

9. A method according to claim 1, further comprising:
   shifting the sampling region about the surface point before creating the multi-dimensional set of sub-regions.

10. A method according to claim 1, wherein:
    the sampling region and the multi-dimensional set of sub-regions correspond to different MIP levels.

11. A method according to claim 1, wherein:
    processing the local attributes includes averaging the values of each local attribute.

12. A method according to claim 1, wherein:
    processing the local attributes includes doing a weighted average of the values of each local attribute.

13. A method according to claim 1, further comprising:
receiving a sharpness value for the surface point, the sharpness value determining the number of sub-regions in the multi-dimensional set of sub-regions.

14. A method of performing an attribute determination for a surface point, comprising the steps, implemented in a computer system, of:
receiving a surface point having an attribute to be determined, the surface point having a location in texture space and a micropolygon sampling region associated therewith;
determining a multi-dimensional set of sub-regions in the sampling region the set of sub-regions having two or more dimensions in texture space;
creating a set of bounding boxes corresponding to the multi-dimensional set of sub-regions, the set of bounding boxes occupying less area than a single bounding box corresponding to the sampling region in texture space;
performing a texture lookup for each sub-region; and
processing the texture lookups to determine an attribute for the surface point.

15. A method according to claim 14, wherein:
performing a texture lookup for each sub-region includes using a respective bounding box from the set of bounding boxes.

16. A method according to claim 14, further comprising:
shifting the sampling region about the surface point before determining a multi-dimensional set of sub-regions in the sampling region.

17. A method according to claim 14, wherein:
the sampling region and the sub-regions correspond to different MIP levels.

18. A method according to claim 14, further comprising:
receiving a sharpness value for the surface point, the sharpness value determining the number of sub-regions in the multi-dimensional set of sub-regions.

19. A computer program product embedded in a non-transitory computer readable storage medium, comprising:
computer program code for receiving a surface point having an attribute to be determined, the surface point having a location and a micropolygon sampling region associated therewith;
computer program code for determining a multi-dimensional set of sub-regions in the sampling region, the set of sub-regions having two or more dimensions in texture space, the sizes of the sub-regions being determined by at least one of a size and a shape of the sampling region;
computer program code for creating a set of bounding boxes corresponding to the multi-dimensional set of sub-regions, the set of bounding boxes occupying less area than a single bounding box corresponding to the sampling region in texture space;
computer program code for determining a local attribute for each sub-region based on a pre-computed array of values for that sub-region; and
computer program code for processing the local attributes for each sub-region to determine an attribute for the surface point.

20. A computer program product according to claim 19, further comprising:
computer program code for creating a set of bounding boxes corresponding to the multi-dimensional set of sub-regions, the set of bounding boxes occupying less area than a single bounding box corresponding to the sampling region.

21. A computer program product according to claim 20, further comprising:
computer program code for determining a local attribute for each sub-region using a respective bounding box from the set of bounding boxes.

22. A computer program product according to claim 19, further comprising:
computer program code for shifting the sampling region about the surface point before determining the multi-dimensional set of sub-regions in the sampling region.

23. A computer program product embedded in a non-transitory computer readable storage medium, comprising:
computer program code for receiving a surface point having an attribute to be determined, the surface point having a location in texture space and a micropolygon sampling region associated therewith;
computer program code for determining a multi-dimensional set of sub-regions in the sampling region the set of sub-regions having two or more dimensions in texture space;
computer program code for creating a set of bounding boxes corresponding to the multi-dimensional set of sub-regions, the set of bounding boxes occupying less area than a single bounding box corresponding to the sampling region in texture space;
computer program code for performing a texture lookup for each sub-region; and
computer program code for processing the texture lookups to determine an attribute for the surface point.

* * * * *